D. F. ROACH.
HAY-LOADER.
No. 187,908. Patented Feb. 27, 1877.
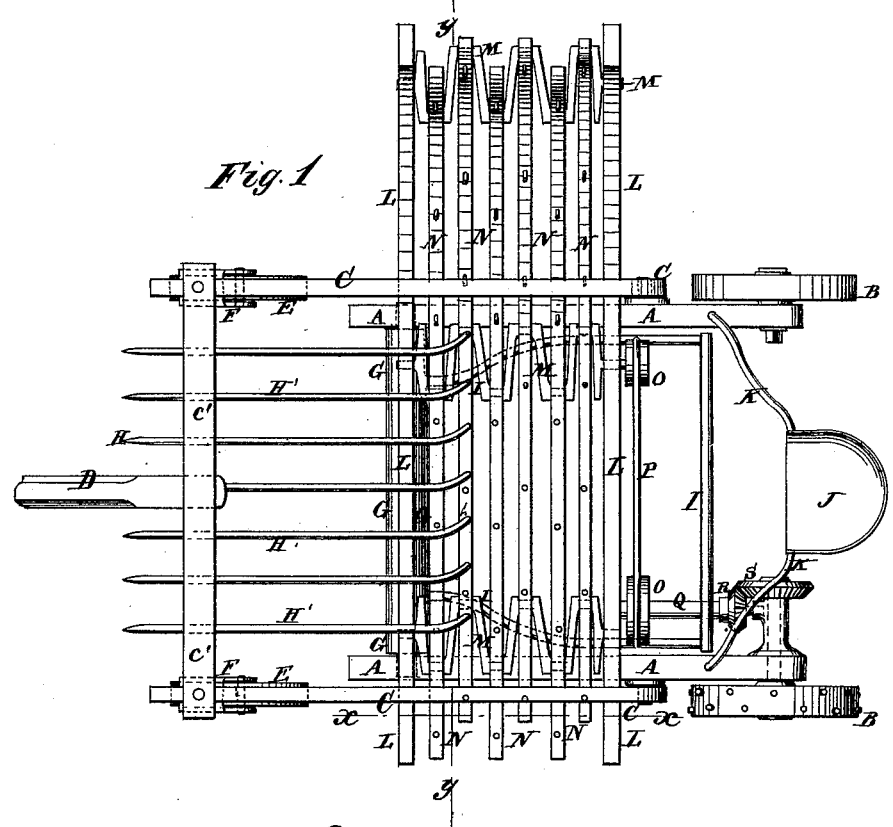
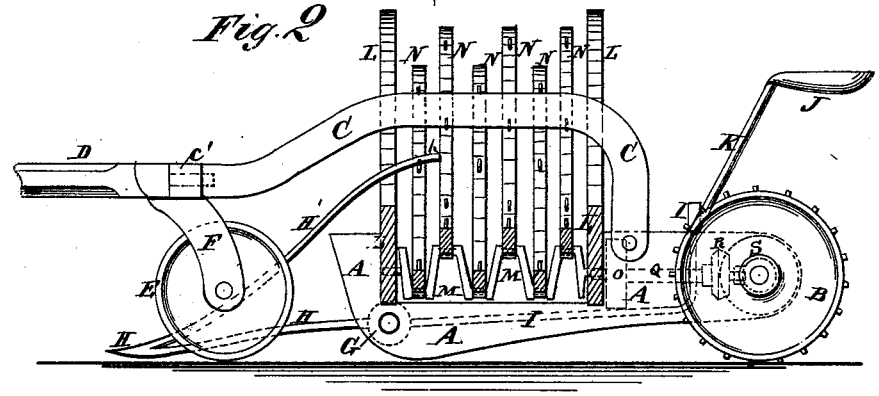
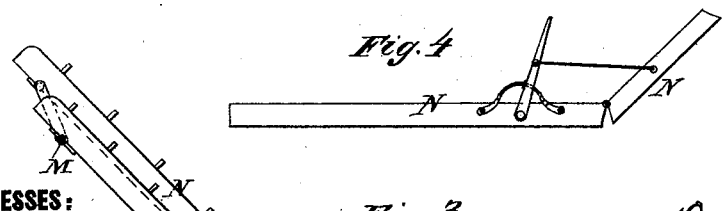
WITNESSES:
A. W. Almqvist
J. H. Scarborough
INVENTOR:
D. F. Roach
BY
[signature]
ATTORNEYS.
N. PETERS, PHOTO-LITHOGRAPHER, WASHINGTON, D. C.

UNITED STATES PATENT OFFICE.

DAVID F. ROACH, OF ATLANTA, ILLINOIS.

IMPROVEMENT IN HAY-LOADERS.

Specification forming part of Letters Patent No. 187,908, dated February 27, 1877; application filed October 23, 1876.

*To all whom it may concern:*

Be it known that I, DAVID FRANKLIN ROACH, of Atlanta, in the county of Logan and State of Illinois, have invented a new and useful Improvement in Hay Rake and Loader, of which the following is a specification:

Figure 1 is a top view of my improved machine. Fig. 2 is a side view of the same, partly in section, through the line $x\,x$, Fig. 1. Fig. 3 is a detail side view of a pair of the elevator-bars. Fig. 4 is a view showing a modification of the elevator bars.

Similar letters of reference indicate corresponding parts.

The object of this invention is to furnish an improved machine for gathering hay and loading it into a wagon, and which shall be simple in construction, convenient in use, and effective in operation.

The invention will first be described in connection with the drawing, and then pointed out in the claims.

A are two parallel bars, that form the main frame. The lower side of the forward ends of the bars A rest upon and slide along the ground, and are rounded off to enable them to pass over the ground freely. To the rear end of one of the bars A is attached an axle for one of the wheels B, and to the rear end of the other bar is attached a long bearing for the revolving axle of the other wheel B. The wheel B, with the revolving axle, is provided with spikes or corrugations upon its face, to prevent it from slipping upon the ground. To the bars A, a little in front of the wheels B, are pivoted the rear ends of the draw-bars C, which are curved upward, forward, downward, and forward, to pass over the elevator and the hay upon it. The forward ends of the draw-bars C are connected by a cross-bar, $c'$, to the middle part of which the tongue D is attached. E are caster-wheels, the standards F of which are swiveled to the forward ends of the draw-bars C, to support said bars, and prevent any down-draft upon the necks of the horses. The caster-wheels E F also enable the machine to be turned easily, and in a very small space. To the lower part of the forward ends of the bars or runners A are pivoted the ends of a roller, G, to which are attached the ends of the lower arms of the teeth H, the upper arms H' of which incline upward, and have their upper ends curved toward the inclined part of the elevator, so that should the teeth of the elevator-bars catch upon the hay before it has dropped from said arms they may pull the hay off said arms, instead of pulling it against their sides. The upper and lower arms of the teeth H may be made of wood, in which case their adjacent ends should be secured in sockets formed in a metal point or shoe. To the roller G are attached two arms or levers, I, which project to the rearward, and their rear ends are bent upward, and are connected by a cross-bar formed upon or attached to them, so that the driver, while sitting upon the seat J, can operate the levers I with his feet, to raise the points of the teeth H, to pass over ridges, furrows, or other obstructions. The supports K for the driver's seat J are attached to the rear parts of the bars or runners A. To the main bars A are attached two parallel cross-bars, L, which project at one end, and inclined upward at an angle. The bars L are made deep, to serve as side boards to keep the hay upon the elevator while being raised to the wagon. To the horizontal and inclined parts of the cross-bars L are pivoted three or more shafts, M, which have three or more pairs of cranks formed upon them, the cranks of each pair projecting upon the opposite sides of the axis of the shaft, and all the cranks being in the same plane. To the pairs of cranks are pivoted pairs of bars N, the upper sides of which are provided with upwardly-projecting pins or teeth, to take hold of the hay and carry it forward. The bars N are bent at the same angle as the side bars L, and the inclined parts of said bars L N are made of such a length as to raise the hay above and drop it upon the wagon.

The bars L N may be made in two parts, hinged to each other at their angles, so that the inclination of the inclined parts of said bars may be varied, as may be desired. In this case the adjustment may be made by a lever, connecting-rod, and catch-bar, or by any other suitable device.

To the journal of one of the crank-shafts M, preferably the middle one, is attached a pulley, O, around which passes an endless belt, P, which also passes around another pulley, O, attached to a shaft, Q, pivoted to the rear bar N, and to the bearing for the revolving axle of the drive-wheel B. To the rear end of the shaft Q is attached a small bevel-gear wheel, R, the teeth of which mesh into the teeth of a larger gear-wheel, S, attached to the inner end of the revolving axle of the drive-wheel B.

By this construction, as the machine is drawn forward one of each pair of the toothed bars N will rise, carry the hay a little distance toward the wagon, and then descend and move back, while the other bars rise and carry the hay forward a little farther, and so on, until it has been delivered upon the wagon, the alternate bars always moving in opposite directions.

Having thus described my invention, I claim as new and desire to secure by Letters Patent—

1. The two parallel bars A A, pivoted to the axles of rear wheels, curved subjacently in front to run on the ground, and supporting the tooth-bar G, substantially as and for the purpose described.

2. The draw-bar C C c', pivoted to frame A at the rear, then curved upwardly and over the elevator, and supported in front on wheels, substantially as and for the purpose set forth.

3. The combination, with wheels B E, of slide-frame A, carrying pivoted rake, the draw-bar frame C, over the elevator, and the elevator arranged at right angles to the rake, substantially as shown and described, for the purpose specified.

DAVID F. ROACH.

Witnesses:
F. L. CAPPS,
A. E. CHURCH.